US007479919B2

(12) United States Patent
Poe et al.

(10) Patent No.: US 7,479,919 B2
(45) Date of Patent: Jan. 20, 2009

(54) SURFACE VEHICLE TRANSPONDER

(75) Inventors: John J. Poe, Woodinville, WA (US); Kevin J Conner, Kent, WA (US)

(73) Assignee: Honeywell International Inc., Morristown, NJ (US)

( * ) Notice: Subject to any disclaimer, the term of this patent is extended or adjusted under 35 U.S.C. 154(b) by 53 days.

(21) Appl. No.: 11/672,235

(22) Filed: Feb. 7, 2007

(65) Prior Publication Data

US 2008/0186221 A1 Aug. 7, 2008

(51) Int. Cl.
*G01S 13/00* (2006.01)
*G01S 13/74* (2006.01)

(52) U.S. Cl. .............................. 342/30; 342/29; 342/32; 342/42; 342/43

(58) Field of Classification Search ................... 342/29, 342/30, 32, 41–47, 63, 69; 340/933, 945, 340/947, 972

See application file for complete search history.

(56) References Cited

U.S. PATENT DOCUMENTS 2,554,893 A * 5/1951 Brunn .......................... 342/30
3,964,024 A * 6/1976 Hutton et al. ............ 340/10.34
4,379,497 A * 4/1983 Hainsworth et al. .......... 180/168
5,311,186 A * 5/1994 Utsu et al. ..................... 342/51
5,334,982 A * 8/1994 Owen ........................... 342/36
5,400,031 A * 3/1995 Fitts ............................ 342/36
5,506,584 A * 4/1996 Boles ........................... 342/42
5,629,691 A * 5/1997 Jain ............................ 340/961
5,636,123 A * 6/1997 Rich et al. .................. 701/207
5,751,973 A * 5/1998 Hassett ........................ 705/13
6,195,609 B1 * 2/2001 Pilley et al. ................. 701/120
6,405,132 B1 * 6/2002 Breed et al. ................. 701/301
6,433,729 B1 * 8/2002 Staggs ......................... 342/29
6,606,563 B2 * 8/2003 Corcoran, III ............... 701/301
6,690,295 B1 * 2/2004 De Boer ..................... 340/951
6,850,185 B1 * 2/2005 Woodell ...................... 342/30
6,927,701 B2 * 8/2005 Schmidt et al. ............. 340/959
7,117,089 B2 * 10/2006 Khatwa et al. .............. 701/301
7,161,500 B2 * 1/2007 Alfredsson et al. .......... 340/961
7,206,698 B2 * 4/2007 Conner et al. ............... 701/301
7,256,728 B1 * 8/2007 Kenny et al. .................. 342/36
7,262,730 B2 * 8/2007 Larsson et al. ................ 342/29
7,363,145 B2 * 4/2008 Conner et al. ............... 701/120
2002/0109625 A1 * 8/2002 Gouvary ...................... 342/29
2002/0116127 A1 * 8/2002 Sadler ........................ 701/301
2002/0163461 A1 * 11/2002 Smithey ...................... 342/29
2003/0227395 A1 * 12/2003 Zeineh ....................... 340/988
2004/0030465 A1 * 2/2004 Conner et al. ................. 701/16
2004/0145499 A1 * 7/2004 Schmidt et al. ............. 340/947
2006/0066470 A1 * 3/2006 Anderson et al. ............. 342/29
2007/0067093 A1 * 3/2007 Pepitone ..................... 701/120

* cited by examiner

*Primary Examiner*—Thomas H Tarcza
*Assistant Examiner*—Peter M Bythrow
(74) *Attorney, Agent, or Firm*—Black Lowe & Graham

(57) ABSTRACT

Systems and methods for alerting surrounding aircraft if a ground-based unit is a threat. One example system is located on a ground-based unit. The system includes a position sensor that senses position of the ground-based unit, a memory that stores predefined threat zone information, a transmitter that transmits a predefined transponder signal, and a processor in data communication with the position sensor, the memory, and the transmitter. The processor instructs the transmitter to transmit the transponder signal based on the threat zone information and the sensed position of the ground-based unit.

14 Claims, 3 Drawing Sheets

SURFACE VEHICLE TRANSPONDER

BACKGROUND OF THE INVENTION

The prevention of runway incursions has been an issue of increasing concern and has resulted in the development of the Airport Surface Detection Equipment (ASDE-3), the Airport Movement Area System (AMASS), and the Airport Surface Traffic Automation Program (ASTA).

The most relevant prior art relating to the present invention, and airport surface monitoring and runway incursion systems in particular, is the ASDE-3 radar system which is a single high power Ku-Band real aperture radar that is located on a tower adjacent to an airport. The ASDE-3 system experiences shadowing and multiple reflections that seriously affect the performance, which is a consequence of the fact that it is a single radar system. The ASDE-3 radar system is also a very expensive solution.

Therefore, there is a need for an improved system for monitoring runway incursions at airports.

SUMMARY OF THE INVENTION

The present invention includes systems and methods for alerting surrounding aircraft if a ground-based unit is a threat. One example system is located on a ground-based unit. The system includes a position sensor that senses position of the ground-based unit, a memory that stores predefined threat zone information, a transmitter that transmits a predefined transponder signal, and a processor in data communication with the position sensor, the memory, and the transmitter. The processor instructs the transmitter to transmit the transponder signal based on the threat zone information and the sensed position of the ground-based unit.

In one aspect of the present invention, the system has a power source distinct from a power source of the ground-based unit or a power source that is the power source of the ground-based unit.

In another aspect of the present invention, the ground-based unit is a surface vehicle and the threat zone information includes runways and/or taxiways. The processor instructs the transmitter to transmit the transponder signal if the sensed position indicates that the surface vehicle is within a predefined threat zone based on the stored predefined threat zone information.

In still another aspect of the present invention, the transponder signal includes at least one of surface vehicle location, surface vehicle speed, direction of travel of the surface vehicle, or a unique identifier of the surface vehicle. The transmitter is instructed to transmit a transponder signal if the processor determines that the vehicle speed and direction of travel indicate that the surface vehicle will enter a threat zone within a threshold period of time. The transmitter is instructed to discontinue transmission of a transponder signal if the processor determines that the vehicle speed and direction of travel indicate that the surface vehicle will exit a threat zone within a threshold period of time.

In yet another aspect of the present invention, the ground-based unit is not a vehicle.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
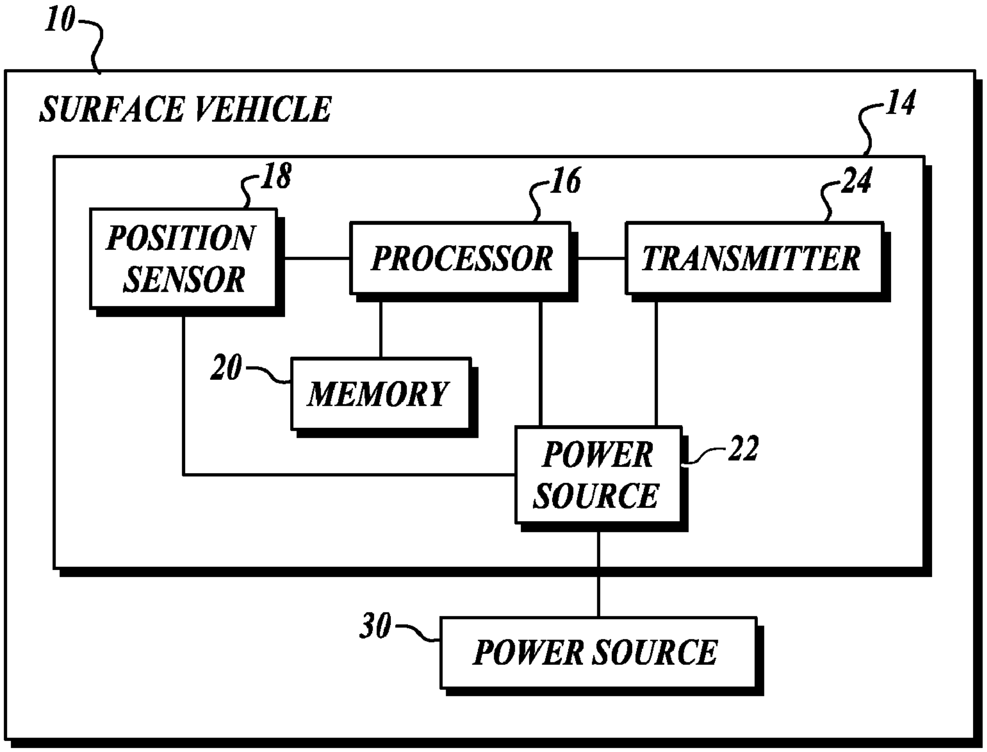
FIG. 1 illustrates a block diagram of an example system formed in accordance with an embodiment of the present invention.

As shown in FIG. 1, a Surface Vehicle Transponder System 14 located on a surface vehicle 10 determines if the surface vehicle 10 is located in a threat zone (such as airport runway or similar areas that are a threat to aircraft operating in the airport area). The transponder system 14 includes a processor 16, a position sensor 18, memory 20, and a transmitter 24. The transponder system 14 may include an internal power source 22 or may be connected to a power source 30 of the surface vehicle 10.

The processor 16 is in data communication with the position sensor 18, the memory 20 and the transmitter 24. The processor 16 receives position information from the position sensor 18 and determines if the surface vehicle 10 is located in a threat zone of an airport based on threat zone information stored in the memory 20. If the processor 16 determines that the surface vehicle is in a threat zone, then the processor 16 instructs the transmitter 24 to broadcast a signal (such as a transponder signal) that can be received and interpreted by local aircraft.

The position sensor 18 may be a Global Positioning System (GPS) or a device that determines location from signals received from devices located at various locations around the airport.

The signal broadcasted by the transmitter 24 may be over any of a number of frequencies adhering to various protocols that may be received and successfully interpreted by local aircraft. Example signal protocols may be broadcast according to known standard protocols such as Universal Access Transceiver (UAT) or Automatic Dependence Surveillance-Broadcast (ADS-B). The broadcast signal includes any of the following information: surface vehicle location information, surface vehicle speed, direction of travel of the surface vehicle, a unique identifier of the vehicle, or any other information useful to receiving systems (e.g. aircraft, tower).

Figure 2:
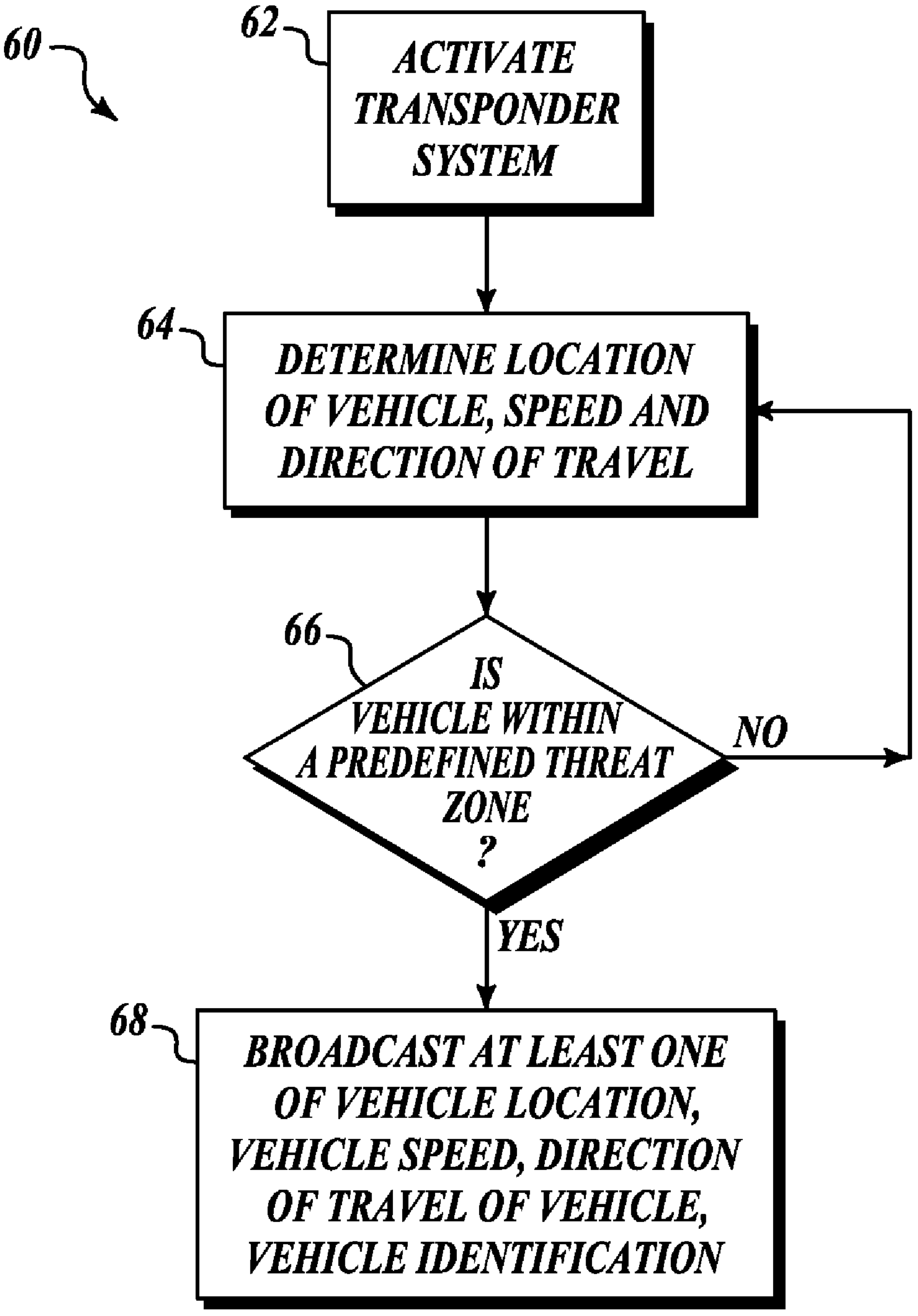
FIG. 2 illustrates an example process performed by the system shown in FIG. 1.

FIG. 2 illustrates an example process 60 performed by the system 14 shown in FIG. 1. First at a block 62, the transponder system 14 is activated. Activation is performed by applying power to the transponder system 14. Next, at a block 64, the position sensor 18 determines the location, the speed and direction of travel of the surface vehicle 10. In an alternate embodiment, the speed and direction of travel are determined by the processor 16. At a decision block 66, the processor 16 determines if the surface vehicle 10 is within a predefined threat zone according to threat zone information stored in the memory and the determined location of the surface vehicle 10. If the processor 16 determines that the surface vehicle 10 is not within a predefined threat zone, the process 60 returns to block 64 to repeat. If the processor 16 determines that the surface vehicle 10 is within a predefined threat zone, then at a block 68, the transmitter 24 broadcasts at least one of vehicle location, vehicle speed, direction of travel, or vehicle identification via a predefined transmission protocol.

In an alternate embodiment, the transmitter 24 broadcasts a signal, if the processor 16 determines that surface vehicle 10 will penetrate a predefined threat zone within a threshold period of time based on the vehicle location, speed and direction of travel. In still another embodiment, if a surface vehicle 10 is located within a threat zone, the processor 16 instructs the transmitter 24 to discontinue the transmission of the broadcast signal, if the processor 16 determines that the surface vehicle 10 will be exiting the threat zone before a predefined time limit expires based on location, speed, and direction of travel information.

Figure 3:
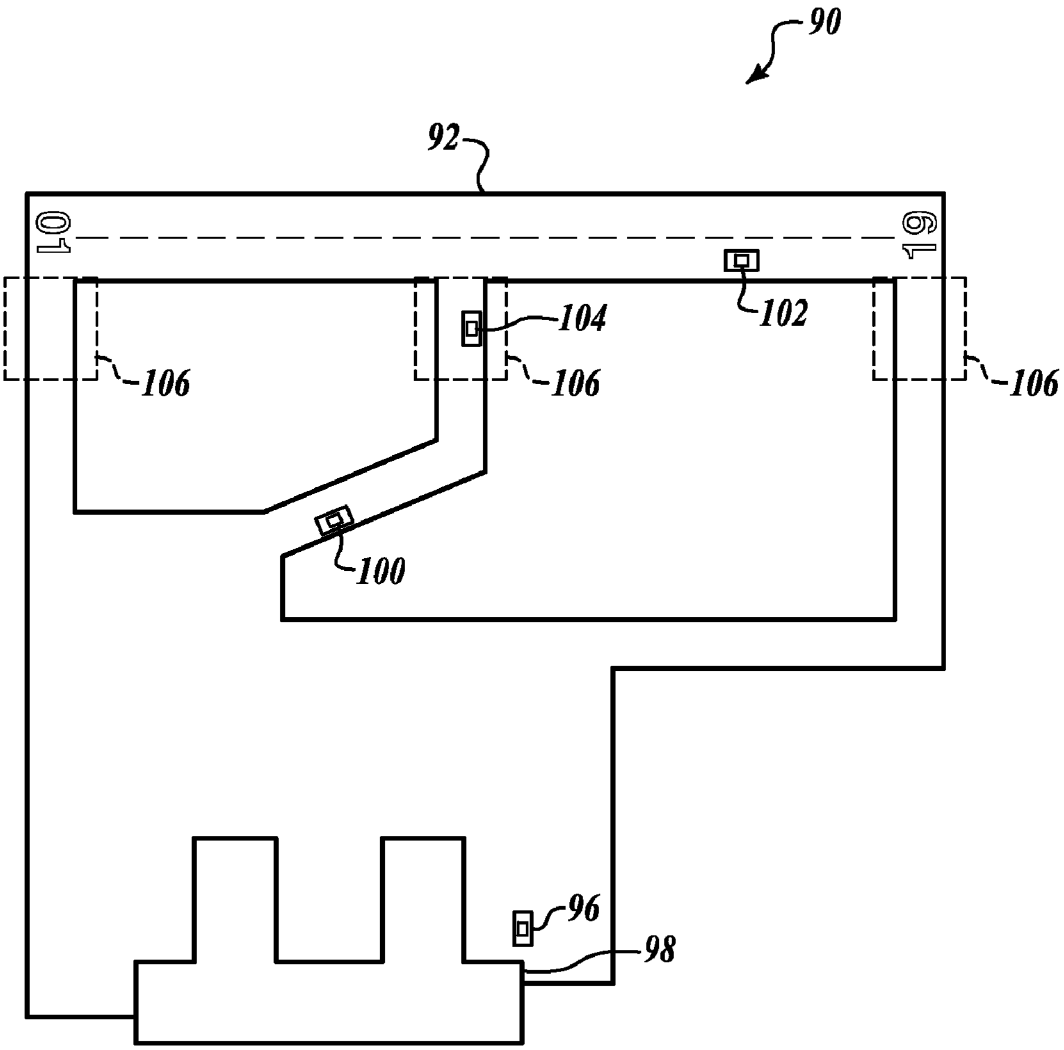
FIG. 3 is a top-down view of an airport with vehicles that are implementing the system of FIG. 1.

FIG. 3 illustrates a top-down view of an airport 90 that includes a runway 92, taxiways and a tarmac with a terminal 98. Surface vehicles 96, 100, 102 and 104 are shown located at various points throughout the airport 90. Each of the surface vehicles 96, 100, 102 and 104 include the transponder system 14 as described above. In this embodiment, threat zone information stored in the memory 20 includes the runway 92 and a portion of the taxiways adjacent to the runway 92 (zones 106). When the transponder systems 14 in the vehicles 96, 100, 102 and 104 are activated, their location, speed and direction of travel (or just location) are determined. The systems 14 then determine if the associated surface vehicle 10 is a threat based on location, speed, direction of travel (or just location) and threat zone information stored in memory 20. Because vehicles 96 and 100 are not within the threat zones (runway 92 and zone 106), nothing occurs. In other words, the transmitters 24 of the transponder systems 14 are not instructed to transmit any signals indicating that the surface vehicles associated with the transponder systems 14 is a threat to aircraft. However, surface vehicles 102 and 104 are within the threat zones (runway 92 and zone 106) and, therefore, the processors 16 instruct the transmitters 24 to transmit transponder signals thereby allowing them aircraft within the vicinity of the airport 90 to have knowledge of their presence.

While the preferred embodiment of the invention has been illustrated and described, as noted above, many changes can be made without departing from the spirit and scope of the invention. For example, the transponder system may be used on other ground-based units, such as stationary units located at a location that is a threat to aircraft (e.g. closed taxiway). Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A transponder system located on a ground-based unit for alerting surrounding aircraft if the ground-based unit is a threat, the system comprising:

a position sensor configured to sense position of the ground-based unit;

a memory configured to store predefined threat zone information;

a transmitter configured to transmit a predefined transponder signal; and a processor in data communication with the position sensor, the memory, and the transmitter, the processor configured to instruct the transmitter to transmit the transponder signal based on the threat zone information and the sensed position of the ground-based unit, wherein the transponder signal includes at least one of surface vehicle location, ground-based unit speed, direction of travel of the ground-based unit, or a unique identifier of the ground-based unit, wherein the transmitter is instructed to transmit a transponder signal if the processor determines that the speed and direction of travel indicate that the ground-based unit will enter a threat zone within a threshold period of time.

2. The system of claim 1, further comprising at least one of a power source distinct from a power source of the ground-based unit or a power source that is the power source of the ground-based unit.

3. The system of claim 1, wherein the ground-based unit is a surface vehicle.

4. The system of claim 3, wherein the threat zone information includes at least one of a runway or a taxiway.

5. The system of claim 3, wherein the processor instructs the transmitter to transmit the transponder signal if the sensed position indicates that the surface vehicle is within a predefined threat zone based on the stored predefined threat zone information.

6. The system of claim 1, wherein the ground-based unit is not a vehicle.

7. A transponder system located on a ground-based unit for alerting surrounding aircraft if the ground-based unit is a threat, the system comprising:

a position sensor configured to sense position of the ground-based unit;

a memory configured to store predefined threat zone information;

a transmitter configured to transmit a predefined transponder signal; and a processor in data communication with the position sensor, the memory, and the transmitter, the processor configured to instruct the transmitter to transmit the transponder signal based on the threat zone information and the sensed position of the ground-based unit, wherein the transponder signal includes at least one of ground-based unit location, ground-based unit speed, direction of travel of the ground-based unit, or a unique identifier of the ground-based unit, wherein the transmitter is instructed to discontinue transmission of a transponder signal if the processor determines that the speed and direction of travel indicate that the ground-based unit will exit a threat zone within a threshold period of time.

8. A method for alerting surrounding aircraft if the ground-based unit is a threat, the system comprising:

sensing position of the ground-based unit; and instructing a transmitter to transmit a predefined transponder signal based on previously stored threat zone information and the sensed position of the ground-based unit, wherein the transponder signal includes at least one of ground-based unit location, ground-based unit speed, direction of travel of the ground-based unit, or a unique identifier of the ground-based unit, wherein instructing comprises instructing the transmitter to transmit a transponder signal if the processor determines that the speed and direction of travel indicate that the ground-based unit will enter a threat zone within a threshold period of time.

9. The method of claim 8, further comprising at least one of a power source distinct from a power source of the ground-based unit or a power source that is the power source of the ground-based unit.

10. The method of claim 8, wherein the ground-based unit is a surface vehicle.

11. The method of claim 10, wherein the threat zone information includes at least one of a runway or a taxiway.

12. The method of claim 10, wherein instructing comprises instructing the transmitter to transmit the transponder signal if the sensed position indicates that the surface vehicle is within a predefined threat zone based on the stored predefined threat zone information.

13. The method of claim 8, wherein the ground-based unit is not a vehicle.

14. A method for alerting surrounding aircraft if the ground-based unit is a threat, the system comprising:

sensing position of the ground-based unit; and instructing a transmitter to transmit a predefined transponder signal based on previously stored threat zone information and the sensed position of the ground-based unit, wherein the transponder signal includes at least one of ground-based unit location, ground-based unit speed, direction of travel of the ground-based unit, or a unique identifier of the ground-based unit, wherein instructing comprises instructing the transmitter to discontinue transmission of a transponder signal if the processor determines that the speed and direction of travel indicate that the ground-based unit will exit a threat zone within a threshold period of time.

* * * * *